(12) United States Patent
Ries et al.

(10) Patent No.: US 6,958,898 B2
(45) Date of Patent: Oct. 25, 2005

(54) FLUX PUMP WITH A SUPERCONDUCTOR AND SUPERCONDUCTING ELECTROMAGNET TO BE OPERATED THEREWITH

(75) Inventors: Günter Ries, Erlangen (DE); Florian Steinmeyer, Witney (DE); Markus Vester, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 517 days.

(21) Appl. No.: 10/033,035

(22) Filed: Dec. 27, 2001

(65) Prior Publication Data

US 2002/0121953 A1 Sep. 5, 2002

(30) Foreign Application Priority Data

Dec. 27, 2000 (DE) ........................................ 100 65 400

(51) Int. Cl.[7] ................................................ H02H 7/00
(52) U.S. Cl. .......................................... 361/141; 361/19
(58) Field of Search ........................ 361/19, 139, 140, 361/141, 142, 143, 18; 335/216

(56) References Cited

U.S. PATENT DOCUMENTS

| | | | | |
|---|---|---|---|---|
| 3,835,369 A | * | 9/1974 | Zoleta | 323/328 |
| 4,688,132 A | * | 8/1987 | Dustmann | 361/19 |
| 4,709,314 A | * | 11/1987 | van de Klundert et al. | 363/14 |
| 5,665,959 A | * | 9/1997 | Fossum et al. | 250/208.1 |
| 5,965,959 A | * | 10/1999 | Gamble et al. | 307/125 |
| 5,990,459 A | * | 11/1999 | Feustel et al. | 219/486 |
| 6,420,842 B1 | * | 7/2002 | Gold | 318/141 |

OTHER PUBLICATIONS

"Study of Full–wave Superconducting Rectifier–type Flux–pumps", Qiuliang Wang et al., *IEEE Transactions on Magnetics*, vol. 32, No. 4, pp. 2699–2702, Jul. 1996.

"On fully conducting rectifiers and fluxpumps. A review. Part 2: Commutation modes, characteristics and switches", L.J.M. van de Klundert et al., *Cryogencis*, pp. 267–277, May 1981.

"The 11th International Symposium on Power Semiconductor Devices and ICs", IEEE Electron Devices Society, May 1999.

"Fully superconducting rectifiers and fluxpumps Part 1: Realized methods for pumping flux", L.J.M. van de Klundert et al., *Cryogenics*, pp. 195–206, Apr. 1981.

* cited by examiner

Primary Examiner—Stephen W. Jackson
Assistant Examiner—Danny Nguyen
(74) Attorney, Agent, or Firm—Harness, Dickey & Pierce, P.L.C.

(57) ABSTRACT

A device includes a flux pump and an electromagnet to be fed thereby for the production of highly constant magnetic fields of high field strength. In a flux pump of the rectifier type, switches used are MOSFETs. These MOSFETs include $HT_c$ superconductor material at operating temperatures. Preferably, the flux pump and a coil of the electromagnet are arranged in one and the same cryostat housing.

32 Claims, 5 Drawing Sheets

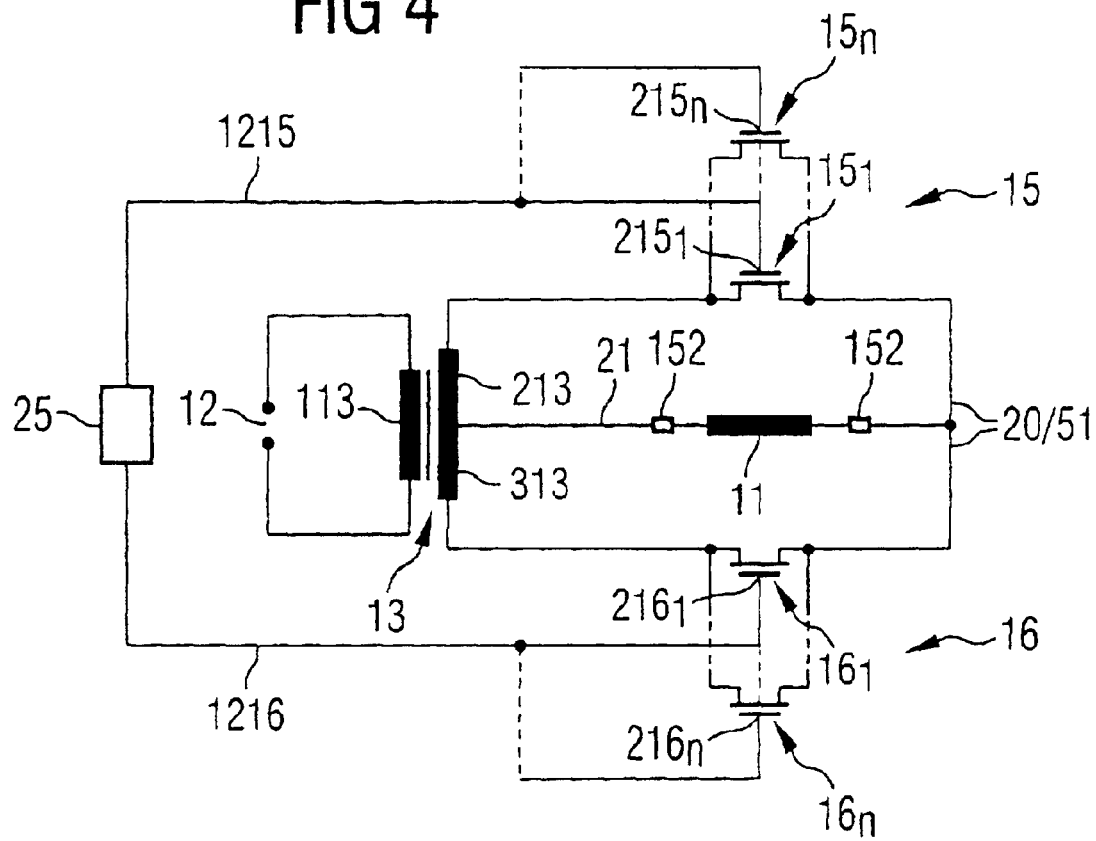
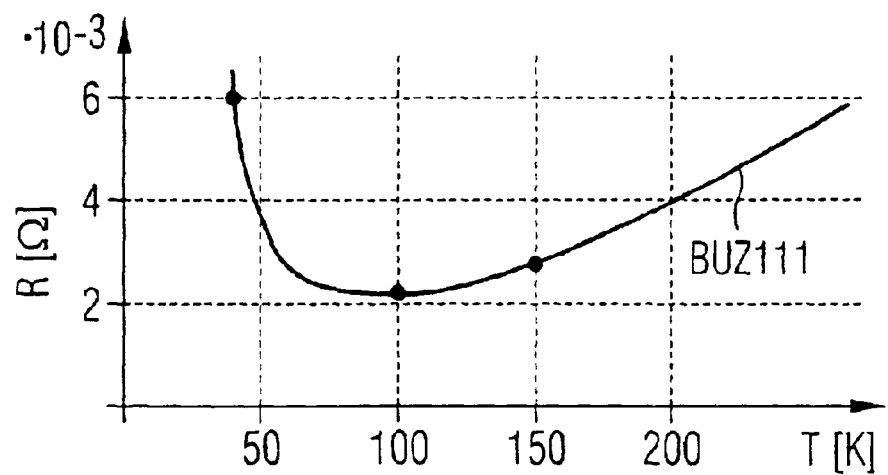

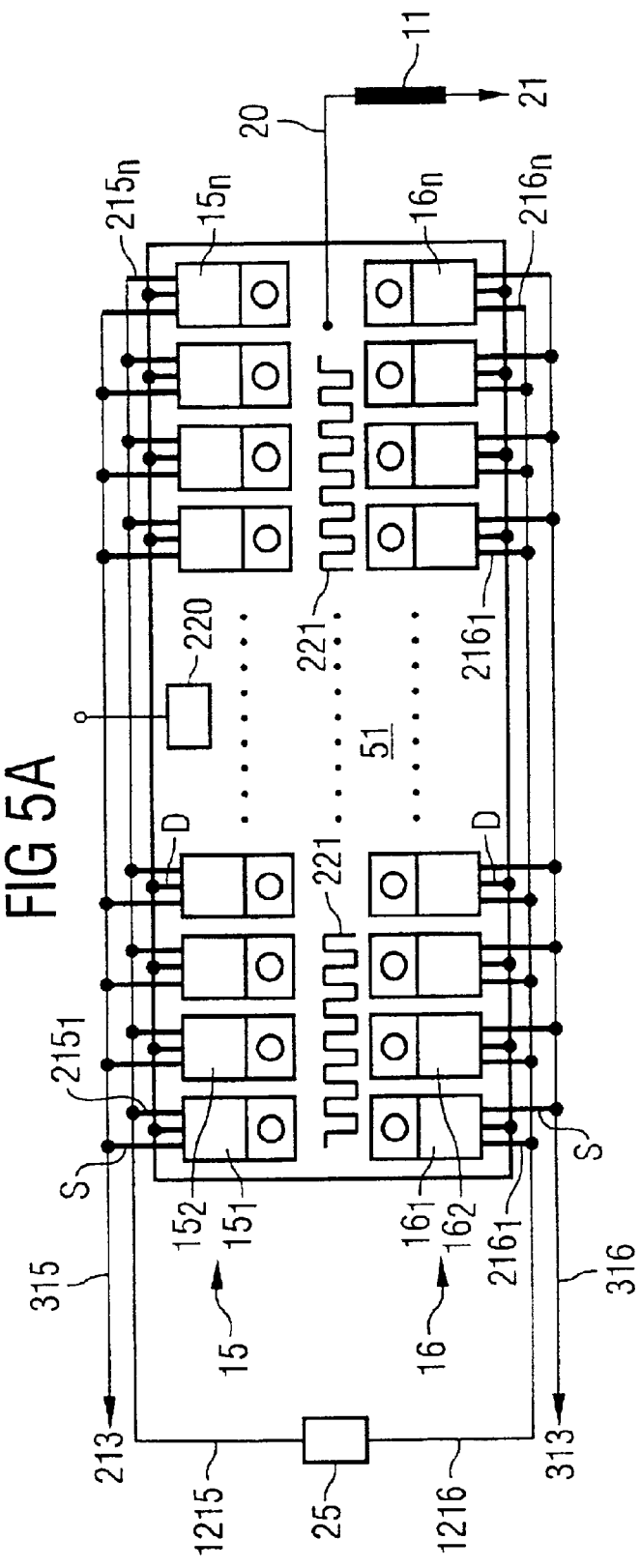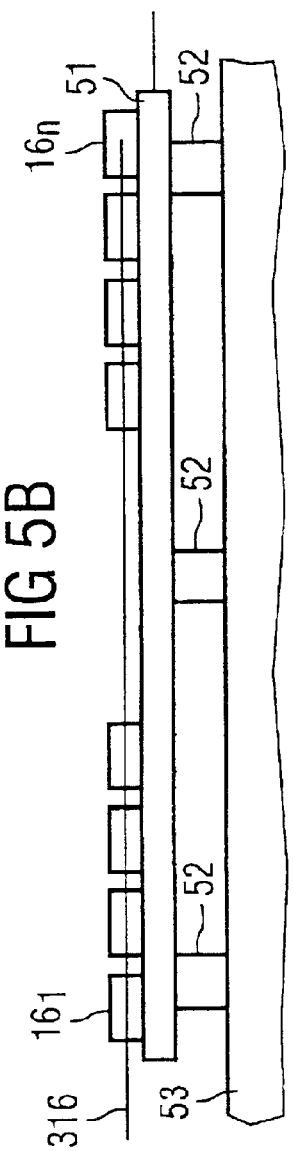

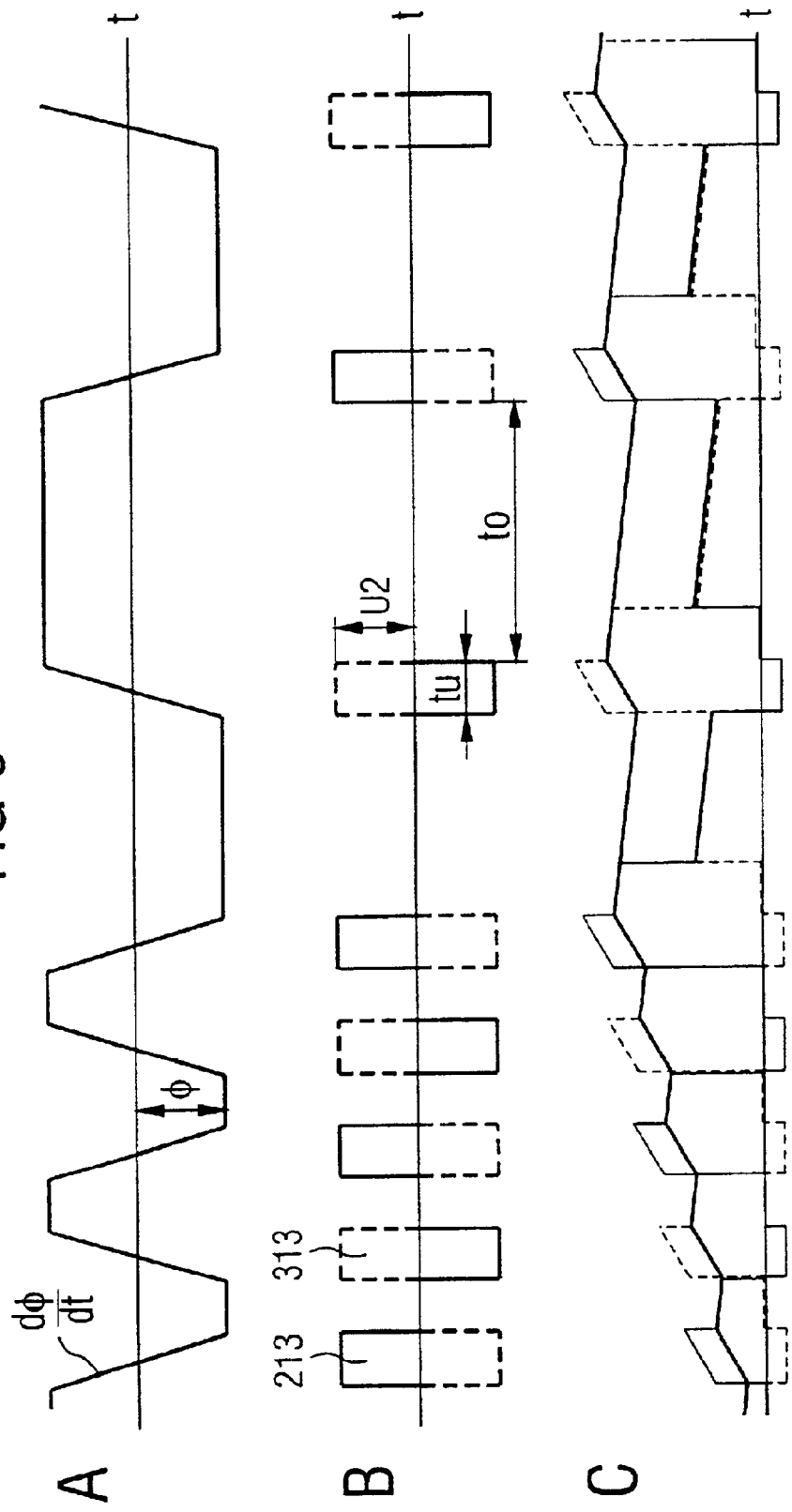

FLUX PUMP WITH A SUPERCONDUCTOR AND SUPERCONDUCTING ELECTROMAGNET TO BE OPERATED THEREWITH

The present application hereby claims priority under 35 U.S.C. §119 on German patent publication number DE 10065400.2 filed Dec. 27, 2000, the entire contents of which are hereby incorporated by reference.

FIELD OF THE INVENTION

The present invention generally relates to a flux pump of the rectifier type. More preferably, it relates to one with $HT_c$ (high temperature) superconducting switches and an $HT_c$—superconducting electromagnet to be operated with this flux pump.

BACKGROUND OF THE INVENTION

For nuclear spin tomography, for example, relatively high magnetic fields with additionally relatively high constancy of the respective magnetic field strength over time are required. For this purpose, electromagnets with superconducting coils have been developed. Such coils, which include relatively low temperature ($LT_c$) superconductor material such as niobium-tin or niobium-titanium, have already been known for decades. Such magnets have to be operated in a temperature range of about 4 K temperature.

For about one decade, superconducting materials of the relatively high temperature type ($HT_c$ superconductors) have also been known, which are superconductive up to temperatures above that of liquid air, namely at temperatures less than 77° K. Electromagnets with $HT_c$ superconducting coils which can be used for relatively high magnetic fields, for example up to temperatures of less than about 40 K, have also already been produced. This lower operating temperature is based on the fact that the $HT_c$ current carrying capacity of $HT_c$ superconductor materials used for the purpose, for example bismuth cuprates such as $(Bi, Pb)_2Sr_2Ca_2Cu_3O_{10}$ and $Bi_2Sr_2CaCu_2O_8$ and rare earth cuprates RE $Ba_2Cu_3O_7$, with RE=Nd, Gd, Sm, Er, Y, is only adequate down to a respective operating temperature which is limited as a function of the level of the prevailing magnetic field.

In the ideal case, a short-circuit superconducting current once produced and flowing in such a superconducting coil of a magnet persists. In order to feed such a superconducting current into a superconductor coil, a device known as a flux pump is used, for example. Such a flux pump is disclosed, for example, by "Study of Full-Wave Superconducting Rectifier-Type Flux-Pumps", in IEEE Transactions on Magnetics, Vol. 32 (1996) pp. 2699–2702 and from "On Fully Superconducting Rectifiers and Flux Pumps", Cryogenics, May 1991, pages 262–275.

The aforementioned prior art relates exclusively to superconductors of the relatively low temperature ($LT_c$)type, that is to materials such as the aforementioned niobium-tin and niobium-titanium. FIG. 1 shows an example of a flux pump 2 of the rectifier type from the prior art (from IEEE Transactions . . . , as above), in which 11 designates the superconducting coil with $LT_c$ superconductor of an electromagnet 111, such as is used for the nuclear spin tomography already mentioned, for example. Numeral 12 designates a current source which supplies the electrical power which is used to build up the superconducting current that flows in the coil 11 during the operation of the electromagnet. Numeral 13 designates a transformer having a primary coil 113 and, in this example, 2 secondary coils 213 and 313 connected in series. Numerals 15 and 16 designate two switches for connecting and interrupting the superconducting current flowing in the circuit of the respective secondary coil 213 and 313, respectively.

In the prior art, these two secondary coils and switches include $LT_c$. In order to be able to act as a transformer 13, the current source 12 designated in general terms supplies an alternating current, that is to say a current with a repeatedly successive opposed flow direction. In accordance with the cycle rate of this change of flow direction, the switches 15 and 16 are opened and closed, specifically in opposition to each other in each case. Rectification of the electric current flowing through the lines designated by 20 and 21 is therefore carried out. This current is the feed current for the coil 11 of the electromagnet. Numeral 23 designates a known safety device, not specifically explained here, to protect the flux pump 2. Numeral 25 designates a control system for controlling the cycle rate of changing the feed current from the current source 12 and the switches 15 and 16.

In the known flux pump of FIG. 1, the switches 15 and 16 are relatively low temperature ($LT_c$) superconductor switches. Their "open" and "closed" states are provided by the "superconducting" or "normally conducting" states of the conductor material contained in them. The superconducting state is present, given an appropriately deeply cooled state. By heating the respective switch element, the latter is converted to the normally conducting state, which corresponds to an opened switch. This conversion is reversible.

In a known way, by periodically switching over the switches 15 and 16, the coil 11 of the electromagnet or its circuit can be charged up gradually with superconducting current, so that correspondingly gradually, a corresponding direct electromagnetic field of high magnetic field strength or high magnetic flux is generated in the coil 11 of the electromagnet, and is permanent if superconduction is maintained. To a wide extent, this permanence applies to the $LT_c$ superconduction and the materials used for this purpose and already specified above. For example, a superconductor electromagnet, for example one belonging to a nuclear spin tomograph, once charged up, maintains its magnetic field strength so constantly over a long time that the extremely high requirements on the constancy of the field for nuclear spin tomography can be met with this magnetic field. Recharging is necessary, for example, only after about 100 hours assuming that there are no technical deficiencies or operational errors.

In another connection, specifically for electric stores operating in the cryogenic range with a superconducting winding for extremely quickly available electrical power with a required high peak output, it has been proposed (IEEE, ISPD'99, Toronto May 26–28, 1999, pp. 91–94) to use cool MOSFETs in the electrical control system of such stores, for the switches required there. These MOSFETs are advantageously used at up to 1000 V and at relatively low temperatures around about 77 K, since in this temperature range these MOSFETs have a very low forward electrical resistance. In spite of the relatively high current flow during surge operation, only correspondingly relatively low inherent losses of electrical power are produced in them. In this application, these MOSFETs are therefore used to save power during the operation of such peak output stores.

SUMMARY OF THE INVENTION

In the case of the invention, the transformer 13 and the MOSFET switches are preferably located in the cooled medium or room. In this case, it is advantageous that electrical lines having only a small cross section are used for the low currents flowing on the primary side of the transformer, and these lines have only a correspondingly small thermal conduction capacity into the cold room.

In particular, it is beneficial for the invention to operate these MOSFETs in the range of the lowest possible electrical forward resistance of the same when the switches are closed. This is because, in the invention, the electric current flowing in the magnetic coil 11 preferably also flows continuously through the respectively closed switch and gives rise to nonreactive losses there. These losses reduce the required high constancy of the magnetic field which has to be generated by the magnetic field coil 11. The use of the MOSFETs as per the invention at relatively low temperatures as switches for the continuous constant maintenance of this magnetic field is therefore advantageous for the optimized achievement of the set object.

The basic principles of known flux pumps apply to a certain extent to the use envisaged by the invention of relatively high temperature $HT_c$ superconduction materials. For projects and devices according to the invention using such materials it is often desirable to take special or other types of conditions and circumstances into account.

An object of the present invention is, for a flux pump according to the invention or for the combination according to the invention of such a flux pump and a superconductor electromagnet for highly constant magnetic field, to specify the measures with which the corresponding devices can advantageously be implemented with $HT_c$ superconductor material.

BRIEF DESCRIPTION OF THE DRAWINGS

In particular for the purpose of additionally explaining the following description of the invention, use is also made of the figures explained below, which also contain disclosure content relating to the invention.

FIG. 4 shows an embodiment of a switch according to the invention belonging to the rectifier circuit of a flux pump according to the invention.

FIG. 4A shows a graph.

FIGS. 5A and 5B show an exemplary embodiment of a MOSFET circuit arrangement in plan and side view.

FIG. 6 shows an operating graph.

DETAILED DESCRIPTION OF THE PREFERRED EMBODIMENTS

Figure 1:
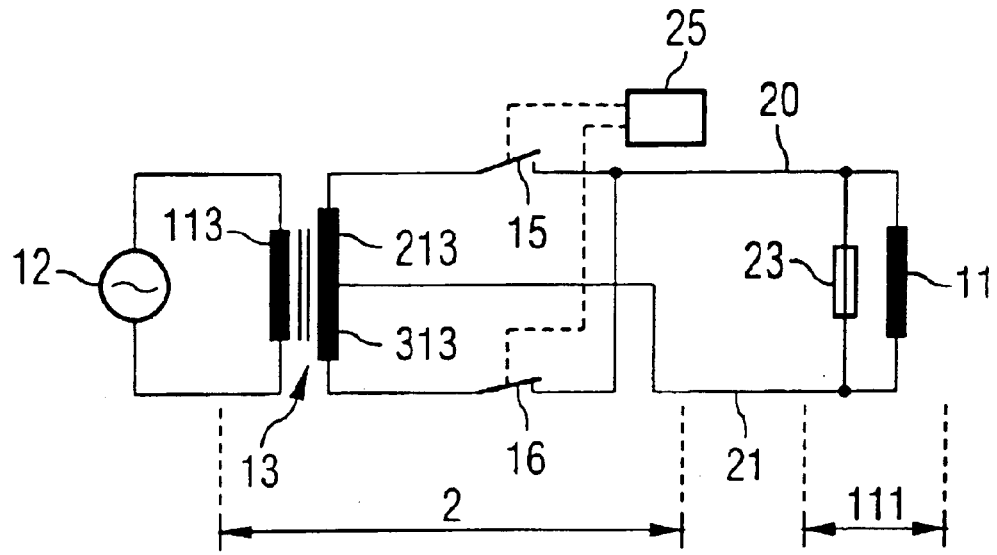
FIG. 1 shows a basic diagram of a known circuit construction such as is also considered in the case of the present invention.

FIG. 1 shows a circuit for the flux pump 2, also designated as a two-path rectifier with two secondary coils. In its stead, it is also possible for the invention to use a bridge circuit, likewise acting in a rectifying manner, such as is generally known from electrical engineering with diodes and is shown here in FIG. 2 as an envisaged design for the invention. Details of this bridge circuit of FIG. 2 which at least substantially correspond to FIG. 1 have the same designations, already defined. Numerals 115 and 116 designate the two additional switches of the bridge circuit, including a total of four switches. In the case of this circuit, only one secondary coil 213 of the transformer 13 is needed.

One advantageous measure of the invention is to arrange at least the superconducting coil 11 of the electromagnet and its associated flux pump in the vacuum chamber of one and the same cryostat 100. An advantage of this measure is that only one cold supply device and only one cryostat vessel are therefore used.

One special condition that may be taken into account is that the device according to the invention is equipped with a superconducting flux pump and a superconducting electromagnet, with $HT_c$ superconductor material for advantageously relatively higher operating temperatures. To this end, it should be designed in such a way that recharging of the electromagnet at an interval of a few seconds respectively by use of the flux pump, can be carried out. This is preferred since, for a device according to the invention with $HT_c$ superconductor material, the required constancy of the magnetic field strength of the magnet can be kept within the predefined tolerance limit only by way of recharging actions following one another at short intervals. This is based substantially on the replacement of the $LT_c$ superconductor material, used as known, by the $HT_c$ superconductor material used according to the invention.

It is also preferred to take into account the fact that, in the case of a device according to the invention with $HT_c$ superconductor material, the flux pump and the magnet are to be operated at advantageously higher temperature, but the two are to be operated at different temperatures. The flux pump, for example, is preferably operated closely below 77 K and the electromagnet in the region of about 40 K.

For the teaching according to the invention, provision is made for the one or more secondary windings of the transformer to provide $HT_c$ superconducting conductors, based on Bi2212, Bi2223 strip conductors and the latter designed in a silver matrix, and/or YBa-CuO conductors on a metallic carrier strip as preferred examples. It is also possible for other $HT_c$ superconductor materials and even those made of wire to be used. For the primary winding of the transformer, it is likewise possible for $HT_c$ superconductor material to be used but for this coil, copper wire is also sufficient, even having very relatively high specific conductivity at 77 K but, disadvantageously, giving rise to Joulian heat losses. The turns ratio of primary coil to respective secondary coil should be chosen as a ratio very much greater than 1, preferably greater than about 100 to 1000. The transformer core preferably to be used includes, in particular, laminated iron, of another soft-magnetic material or is a ferrite. It is also possible for a transformer merely having air-spaced coils to be used.

Figure 3:
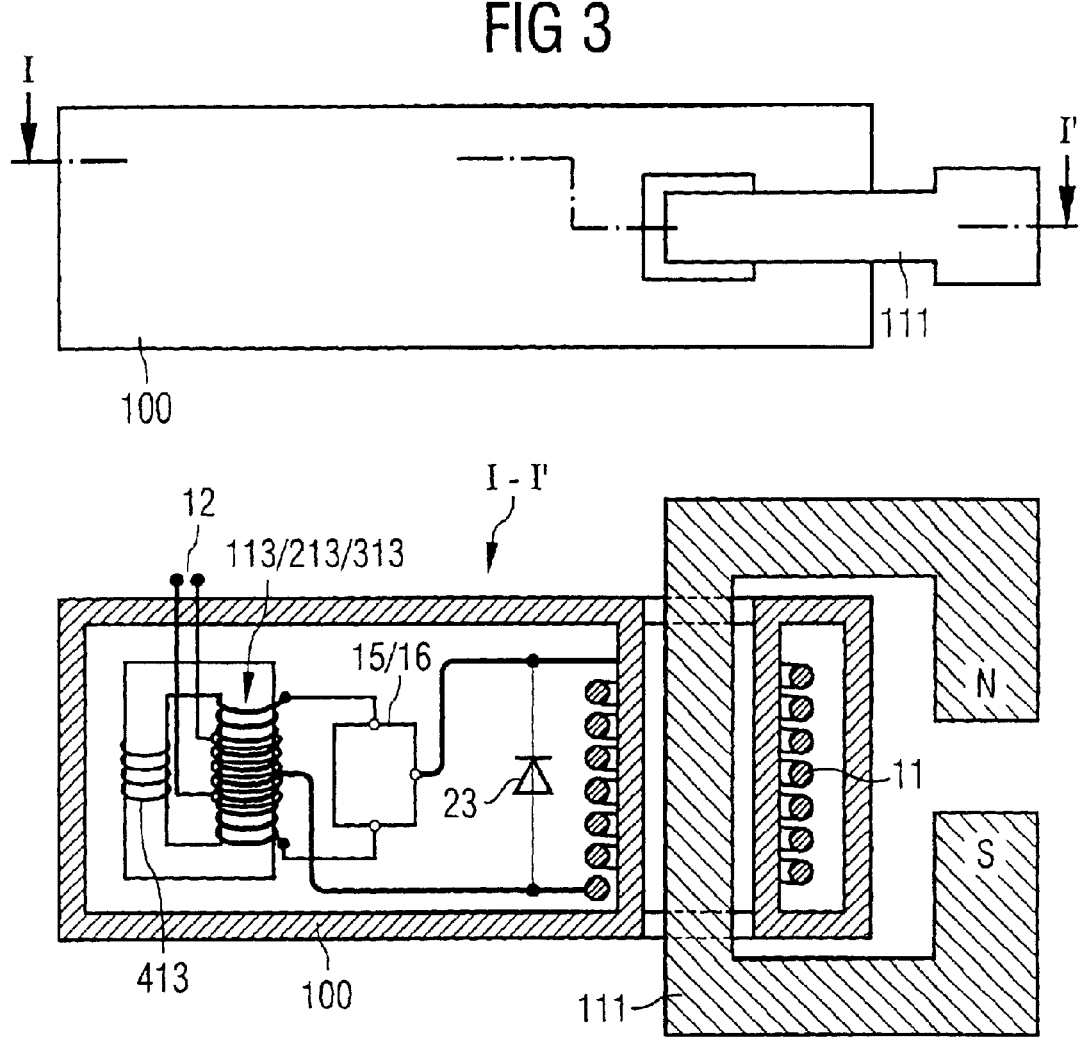
FIG. 3 shows, in a plan view and as a section I–I', a basic structure of a combination according to the invention of a flux pump and electromagnet in a common cryostat.

FIG. 3 shows, in a common cryostat 100, an arrangement according to the invention, substantially including the superconducting coil 11 of the electromagnet 111 and the flux pump 2 with the switch arrangement 15, 16 and the transformer 13 with the primary coil 113 and the secondary coils 213 and 313. The primary coil and the secondary coils are illustrated as wound in one another. The reference symbol 12 indicates the feed current source. Numeral 413 designates a probe coil, with which the magnetic flux in the core provided here for the transformer 13 can be monitored.

FIG. 4 shows an exemplary embodiment relating to switching the flux pump with $HT_c$ superconducting current conductors, and the MOSFET elements used here as switches for the rectifier circuit. The switches 15 and 16 each include a parallel circuit of a number n of MOSFETs $15_1$ to $15_n$ and $16_1$ to $16_n$. The electric current to be switched is distributed to the respectively parallel-connected MOSFETs. The current determines the choice of size of the number of the MOSFETs respectively to be provided and connected in parallel.

In addition, the connections of the field effect electrodes $215_1$ to $215_n$ are connected in parallel with one another and to the control device 25. This is correspondingly true of the MOSFET elements $16_1$ to $16_n$ and their field effect connections $216_1$ to $216_n$.

Suitable MOSFET elements of this type are preferably, but are not limited to, those of the type BUZ 111S from Siemens/Infineon. By using the large number of parallel-connected MOSFET elements $15_1$ to $15_n$ and $16_1$ to $16_n$ a very low forward resistance for the current in the circuit of the flux pump may be achieved. The number n of MOSFET elements is selected to be so large that, when the nominal current is flowing, the voltage drop across the parallel-connected MOSFET elements is at most of the same order of magnitude as that voltage drop which is measurably present across the superconducting coil 11 of the electromagnet 111. A voltage drop of this type lies at values less than 1 mV up to a few mV. It is recommended to individually seek out commercially available MOSFET elements, for example of the specified type, with respect to their forward resistance, specifically the forward resistance at the low operating temperatures of the flux pump.

During the operation of a flux pump of the present invention, it is recommended to operate these MOSFET elements at a temperature between about 60 K and 130 K. FIG. 4A shows that, in such a temperature range, these MOSFET elements even have a minimum of their forward resistance. This can be utilized optimally for the flux pump according to the invention.

Figure 2:
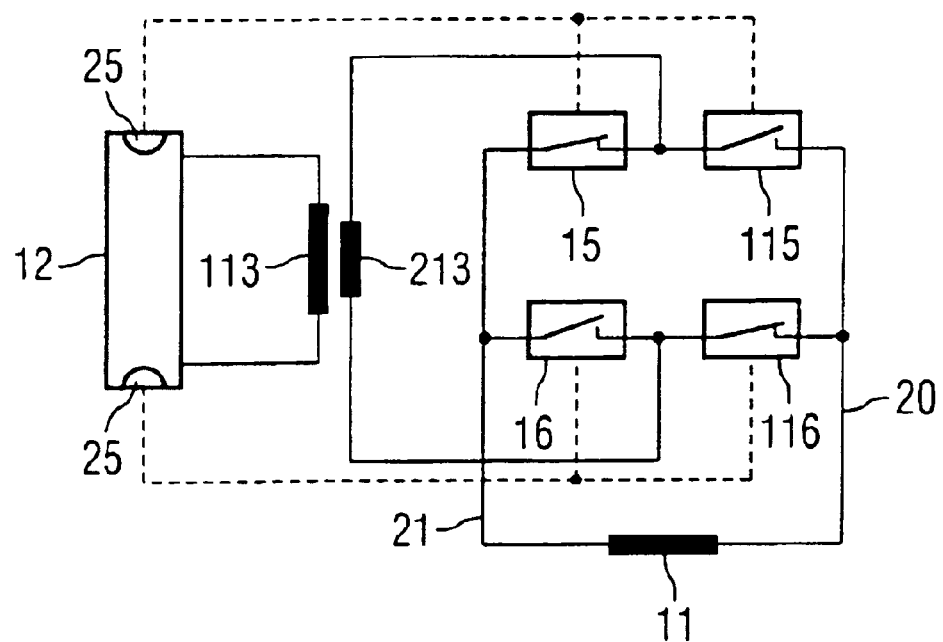
FIG. 2 shows a variant of the rectifier circuit of FIG. 1.

The preceding explanations also apply with the same effect to a rectifier circuit of the flux pump according to FIG. 2 with a bridge circuit. In the latter case, the flux pump according to the invention is operated by use of four groups 15, 16, 115, 116, each having MOSFET elements connected n times in parallel.

FIGS. 5A and 5B show a plan view and side view of a preferred exemplary design embodiment of a switch 15, 16. These two groups $15_1$ to $15_n$ and $16_1$ to $16_n$ or, for a design according to FIG. 2, four groups of MOSFET elements of the present invention are preferably arranged in a good thermally conducting connection with and on, for example, a common base plate 51 or distributed on a plurality of base plates made of copper, for example, or another highly thermally conducting material. Such an arrangement makes it possible to keep these MOSFET elements at the most uniform possible and/or most constant possible selected operating temperature. This operating temperature is maintained via a control loop with a temperature sensor 220 and possibly with additional heating 221 for the base plate and the transistors.

By use of one of their respective drain terminals (D), the parallel-connected MOSFETs $15_1$ to $15_n$ and $16_1$ to $16_n$ are connected electrically, for example to the electrically conductive base plate 51. The respective second source terminal (S) of these MOSFETs is electrically connected to the feed and connecting line 315 for the MOSFETs $15_1$ to $15_n$, and 316 for the MOSFETs $16_1$ to $16_n$. The terminals of the field effect control (gate) electrodes 215 are connected to one another by means of the connecting line 1215 and to the control system 25. This is correspondingly true of the field effect control electrodes 216 and their connecting line 1216.

There are practical cases in which the operating temperature of the coil 11 of the electromagnet 111 is predefined to be lower than that of the base plate 51, for example is at 4.2 K or 20 to 30 K. For this case, it is recommended, between this temperature level and the envisaged temperature level which is optimum for the base plate 51 and the MOSFETs, to use those electrical connections 152 in FIG. 4 which effect only a slight transfer of heat as the transitions between the superconducting connection feed lines of the superconducting coil 11 of the magnet and the lines 20, 21 (see also FIG. 1). For this purpose, HTS superconductor current feeds of a known design are suitable. These can be, for example, those made of Bi2212 or YBaCuO solid material, or else Bi2223 monofilament or multifilament conductors in an AgAu matrix. With regard to the superconducting lines in the circuit, for example 315, 316, the temperature of the MOSFETs will lie below the critical temperature $T_c$ of these lines, that is to say at about 60 to 80 K.

FIG. 5B shows a side view relating to FIG. 5A, with the reference symbols used for FIG. 5A. On the other hand, FIG. 5B shows an embodiment to the effect that the base plate 51 is connected to a platform 53 by means of three mechanical connections 52 illustrated here. This embodiment is suitable if the platform 53 is also thermally connected, for example, to a magnet with a $LT_c$ magnet coil, which is kept at a very low temperature. The connections 52 are then also designed as a defined heat transfer medium or heat brake, by means of which the temperature of the base plate 51 of the MOSFETs can specifically be kept at the beneficial temperature previously specified. It is also necessary to take account of the fact that a certain degree of heat loss occurs in the MOSFETs of the circuit, with which the base plate can be kept at the desired higher temperature, if necessary in addition to a heater 221 that is provided for said base plate. An embodiment of this type is particularly suitable for integrated construction of circuit and superconductor magnet in a common cryostat housing.

The thickness and the sum of the cross sections of the connections 52 are dimensioned such that the heat flow flowing via this heat resistance from the base plate in the direction of the heat sink or lower temperature is approximately equal to or only moderately greater than that heat flow which is supplied by a heater 221 and, in addition thereto, that Joulian heat which occurs in the MOSFETs of the respectively conducting switch path (15 or 16) at the current flowing therein with maximum amplitude. This is a measure provided in accordance with a development of the invention, with which the output of the aforementioned heater has to be minimized for the purpose of controlled maintenance of a constant temperature of the MOSFET elements.

It is preferable for the dissipation of heat to be such that it makes up 1.5 to 3 times the Joulian heat produced in the MOSFETs. The quantity of heat required to maintain or to reach the intended temperature of the base plate is provided by the heater.

In order to dimension an advantageous embodiment of the invention, for a flux pump according to FIG. 5A for a magnet for a nuclear spin tomograph, for example 2×40 MOSFETs of the type BUZ111S are provided. Such a MOSFET exhibits about 2.5 mΩ at 70 K. In each case, these MOSFETs are mounted, for example, on a base plate made of copper in good thermal contact with the latter. At a nominal current of 80 amps, for example, which in total flows through the group of respectively parallel-connected MOSFET elements, a power loss of about 0.4 W occurs in the latter. Together with 0.2 W heat supply from the heater it is therefore necessary for a total of 0.6 W to be dissipated from about 70 K to about 25 K, for example via the aforementioned mechanical connections 52. For a connection as mentioned above, this requires a value of A/d=4 cm (A=total cross section; d=thickness of the connection) in the case of plastics and GRP (glass-fiber reinforced plastic) or, at A/d=0.2 cm in the case of stainless steel, supporting elements for this connection with a height of 1 cm, for example, a cross-sectional area of 4 cm² in the case of GRP material and 0.2 cm² in the case of steel.

In addition, in the case of this embodiment according to the invention of a known flux pump in accordance with the principle, the transformer 13 can be fed on the primary side with sinusoidal or with square-wave voltage or the like with an alternating sign. The sinusoidal frequency or the square-wave pulse train accordingly carries out the driving of the control electrodes in a manner coordinated with time, specifically the field electrodes 215, 216 of the MOSFET elements used as switches and to be opened and to be closed in conductive terms. This driving is carried out using square-wave voltage pulses of greater than/equal to 8 volts in the case of MOSFET elements as specified above or similar type used.

A great advantage of the embodiment according to the invention of a known flux pump according to the principle but with MOSFET elements here as switches in the rectifier circuit of the flux pump is that these MOSFET elements can be driven at frequencies up to a few MHz. This high drive frequency makes it possible to design the transformer 13 to be very small, as compared with known designs. A transformer 13 to be used for the invention can also be designed with a ferrite core or even without a core. The secondary output voltage of the transformer can be selected in accordance with the permissible operating voltages of the MOSFET elements, for example up to 25 volts in the case of type BUZ 111S in a two-branch circuit as illustrated in FIG. 1, or up to even 50 volts in the case of a bridge circuit according to FIG. 2. This technical advantage, which is associated with the invention, permits considerably faster charging and re-discharging of the electromagnet 111, specifically as compared with an embodiment having switches with $HT_c$ superconducting material.

As a development of the invention, semiconductor diodes are provided for the protection of the switches 15, 16 (115, 116) comprising MOSFET elements and are connected in parallel with the respective switch, polarized in the forward direction.

By use of the flux pump 2, the electromagnet 111 is charged up by supplying current from the current source 12. In this regard, reference is also made to FIG. 6. In its lines A to C, this figure shows the processes described below. The processes in the left-hand half of FIG. 6 relate to the complete charging of the electromagnet. The associated right-hand half of FIG. 6 relates to the processes of recharging in order to compensate for losses which occur over time, that is to say the processes relating to the time stabilization of the magnetic field of the electromagnet 111.

As shown in line A, left-hand half, the primary winding 113 of the transformer 13 is fed with voltage/current pulses which are in particular uninterrupted over time, are preferably trapezoidal and have successively opposed signs. Line B shows the pulses, spaced apart from one another over time, belonging to the pulses in line A, on the secondary coils 213 and 313 of the transformer 13. Line C shows the related rise in the charge on the magnetic coil 111.

The right-hand side of FIG. 6, which relates to the time stabilization of the magnetic field strength of the electromagnet 111, differs from the charging process in the left-hand half of FIG. 6 in that the changes in sign of the primary current and the magnetic flux in the transformer 13 are stretched over time, specifically in such a way as is required quantitatively by the recharging, and this can be seen from line C, right-hand half.

The charging of the electromagnet 111 or the recharging of the same for time constancy of its magnetic field is carried out here, according to FIG. 6, by setting the pulse frequency and/or the pulse amplitude and by means of corresponding control of the switches of the rectifier circuit of the flux pump. The pulse frequency can preferably be predefined by or with a control loop.

The control loop includes, for example, measures for periodic NMR field measurement in or on the magnet. For example, the difference between the actual and intended value of the NMR frequency is determined. The difference that occurs is balanced out again by means of an appropriately proportional change in the pulse frequency with which the flux pump at the inlet, that is to say on the primary coil 113 of the transformer 13, is driven.

As an alternative measure for achieving field stabilization, in the area in which the required low temperature prevails, this deviation can also be determined by means of a current measurement or by using a Hall sensor and again converted into a corrected pulse frequency.

In accordance with the processes presented in FIG. 6, an electromagnet 111 once charged up can be discharged again by means of the flux pump, in a manner which is reversible to the effect that the flux pump therefore operates in the reverse direction. In this case, given the same pulse scheme, in each case that switch which was closed during charging is opened, and vice versa.

According to the invention, provision is made to arrange flux pump 2 and magnet 111 advantageously together in a common cryostat. The temperature in this cryostat can be set to the temperature value envisaged for the electromagnet 111, for example the above-mentioned value $T_0$, specifically dimensioned such that the $HT_c$ superconductor material of the coil 11 of the magnet has the necessary current carrying capacity in the magnetic field produced. Provision can then be made for the base plate 46 of the switch arrangement also to be kept at a higher temperature but the latter below the temperature $T_c$ of the superconductor material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device, comprising:
   a superconductor flux pump with a transformer, the transformer including, on a secondary side, at least one superconducting coil in a rectifier circuit and at least two controllable switches; and
   a superconducting coil of an electromagnet,
   wherein the pump feeds current into the superconducting coil,
   wherein the respective secondary-side coil of the transformer includes superconductor material with high critical temperature $T_c$,
   wherein the flux pump and the superconducting coil of the electromagnet are arranged together in a common vacuum chamber of a cryostat, wherein each of the at least two controllable switches in the secondary-side rectifier circuit includes a plurality of MOSFETs electrically connected in parallel to one another, and wherein the MOSFETs are arranged on a base plate of a relatively high thermally conducting material.

2. The device as claimed in claim 1, wherein the MOSFETs are selected, with respect to their electrical forward resistance at a relatively low operating temperature, such that MOSFETs with a relatively low forward resistance are provided in the rectifier circuit.

3. The device as claimed in claim 1, wherein the base plate includes an electric heater to control temperature of the base plate.

4. The device as claimed in claim 1, wherein the base plate includes a temperature sensor for use in a temperature control loop, for use in controlling operating temperature of the MOSFETs.

5. The device as claimed in claim 1, wherein the base plate is connected by mechanical connections with a thermally conductive property, to a heat sink.

6. The device as claimed in claim 5, wherein the heat sink includes a platform.

7. The device as claimed in claim 5, wherein a number and dimensioning of the mechanical connections are selected such that electrical power loss generated in the MOSFET elements of the switches and heat output from a heater, which may be provided, are in time equilibrium with an amount of heat flowing away through the mechanical connections into the platform of the heat sink.

8. The device as claimed in claim 5, wherein the mechanical connections, provided between the base plate of the switches with the MOSFETs and the heat sink, are dimensioned with regard to the their heat dissipations, such that during operation of the device, their heat-dissipating effect is able to reach approximately 1.5 to approximately 3 times a sum of Joulian heat produced in the MOSFETs.

9. The device as claimed in claim 1, wherein the transformer includes a ferrite core.

10. The device as claimed in claim 1, wherein the transformer includes no core.

11. A method of operating a device as claimed in claim 1, comprising feeding the transformer of the flux pump with current pulses.

12. The method of claim 11, wherein the feed is designed in a frequency band up to MHz.

13. The method of claim 11, wherein current stabilization in the electromagnet is implemented by regulating frequency of the pulses of the feed to the transformer of the flux pump.

14. The method of claim 11, wherein current stabilization in the electromagnet is implemented by regulating primary-side current amplitude of the transformer of the flux pump.

15. The method of claim 11, a predefined constant temperature is maintained for the MOSFETs of the switches.

16. The method of operating a device as claimed in claim 11, wherein by regulating the heater, a predefined temperature of the base plate with respect to the lower operating temperature of the coil of the electromagnet is maintained.

17. The device as claimed in claim 3, wherein the base plate includes a temperature sensor for use in a temperature control loop, for use in controlling operating temperature of the MOSFETs.

18. The device as claimed in claim 6, wherein a number and dimensioning of the mechanical connections are selected such that electrical power loss generated in the MOSFET elements of the switches and heat output from a heater, which may be provided, are in time equilibrium with an amount of heat flowing away through the mechanical connections into the platform of the heat sink.

19. The device as claimed in claim 6, wherein the mechanical connections, provided between the base plate of the switches with the MOSFETs and the heat sink, are dimensioned with regard to the their heat dissipations, such that during operation of the device, their heat-dissipating effect is able to reach approximately 1.5 to approximately 3 times a sum of Joulian heat produced in the MOSFETs.

20. The device as claimed in claim 7, wherein the mechanical connections, provided between the base plate of the switches with the MOSFETs and the heat sink, are dimensioned with regard to the their heat dissipations, such that during operation of the device, their heat-dissipating effect is able to reach approximately 1.5 to approximately 3 times a sum of Joulian heat produced in the MOSFETs.

21. The method of claim 12, wherein current stabilization in the electromagnet is implemented by regulating frequency of the pulses of the feed to the transformer of the flux pump.

22. The method of claim 12, wherein current stabilization in the electromagnet is implemented by regulating primary-side current amplitude of the transformer of the flux pump.

23. A superconductor flux pump, comprising:
a transformer, the transformer including, on a secondary side, at least one superconducting coil in a rectifier circuit and at least two controllable switches, the pump being provided to feed current into a superconducting coil of an electromagnet, wherein the respective secondary-side coil includes superconductor material with high critical temperature $T_c$, wherein each of the at least two controllable switches in the secondary-side rectifier circuit includes a plurality of MOSFETs electrically connected in parallel to one another, and wherein the MOSFETs are arranged on a base plate of a relatively highly thermally conducting material.

24. The pump as claimed in claim 23, wherein the MOSFETs are selected, with respect to their electrical forward resistance at a relatively low operating temperature, such that MOSFETs with a relatively low forward resistance are provided in the rectifier circuit.

25. The pump as claimed in claim 23, wherein the base plate includes an electric heater to control temperature of the base plate.

26. The pump as claimed in claim 23, wherein the base plate includes a temperature sensor for use in a temperature control loop, for use in controlling operating temperature of the MOSFETs.

27. The pump as claimed in claim 23, wherein the base plate is connected by mechanical connections with a thermally conductive property, to a heat sink.

28. The pump as claimed in claim 27, wherein the heat sink includes a platform.

29. The pump as claimed in claim 27, wherein a number and dimensioning of the mechanical connections are selected such that electrical power loss generated in the MOSFET elements of the switches and heat output from a heater, which may be provided, are in time equilibrium with an amount of heat flowing away through the mechanical connections into the platform of the heat sink.

30. The pump as claimed in claim 27, wherein the mechanical connections, provided between the base plate of the switches with the MOSFETs and the heat sink, are dimensioned with regard to the their heat dissipations, such that during operation of the device, their heat-dissipating effect is able to reach approximately 1.5 to approximately 3 times a sum of Joulian heat produced in the MOSFETs.

31. The pump as claimed in claim 23, wherein the transformer includes a ferrite core.

32. The pump as claimed in claim 23, wherein the transformer includes no core.

* * * * *